United States Patent
Pfeiffer et al.

(10) Patent No.: US 6,684,220 B1
(45) Date of Patent: Jan. 27, 2004

(54) METHOD AND SYSTEM FOR AUTOMATIC INFORMATION EXCHANGE

(75) Inventors: William P. Pfeiffer, Fort Worth, TX (US); Randall M. Schuessler, Fort Worth, TX (US); Michael R. Yokell, Fort Worth, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 492 days.

(21) Appl. No.: 09/666,029

(22) Filed: Sep. 20, 2000

(51) Int. Cl.[7] ............................................. G06F 17/30
(52) U.S. Cl. ..................................... 707/103 R; 707/2
(58) Field of Search ............................. 707/103 R, 102, 707/3, 1; 705/51, 52, 54, 57, 80; 703/22; 713/187, 201; 717/122, 145, 176; 715/503; 345/734, 744, 784, 821

(56) References Cited

U.S. PATENT DOCUMENTS

| | | | |
|---|---|---|---|
| 5,801,701 A | * 9/1998 | Koppolu et al. | 345/821 |
| 6,032,147 A | 2/2000 | Williams et al. | 707/101 |
| 6,038,393 A | 3/2000 | Iyengar et al. | 395/701 |
| 6,038,565 A | 3/2000 | Nock | 707/701 |
| 6,049,807 A | 4/2000 | Carroll et al. | 707/201 |
| 6,049,822 A | 4/2000 | Mittal | 709/217 |
| 6,101,500 A | * 8/2000 | Lau | 707/103 R |
| 6,282,547 B1 | * 8/2001 | Hirsch | 707/102 |
| 6,466,932 B1 | * 10/2002 | Dennis et al. | 707/3 |

FOREIGN PATENT DOCUMENTS

FR 2 689 260 10/1993 ......... G05B/19/403

OTHER PUBLICATIONS

Bayol, Catherine, "*Une Approche Structurelle et Comportementale de la Modélisation Pour la Vélisation Pour la Vérification de Composants VLSI*", Thése de Docteur de L'Université Joseph Fourier—Grenoble I, 129 pages, Dec. 12, 1995.

Donnel, Brian L., "*Object/Rule Integration in CLIPS*", Expert Systems, vol. 11, No. 1, XP001073801, Feb. 1994, pp. 29–45.

Aho, Alfred V., et al, "*Introduction to Compiling*", 1986, Addison–Wesley Series in Computer Science, Reading, ETATS–UNIS D'AMERIQUE, XP002200775, pgs. 1–15, 19, 60–62, 389–396, 411–431, 1986.

International Search Report dated Jun. 17, 2002 for PCT/US01/28888 filed Sep. 17, 2001, Jun. 17, 2002.

* cited by examiner

Primary Examiner—Diane D. Mizrahi
(74) Attorney, Agent, or Firm—Baker Botts, L.L.P.

(57) ABSTRACT

A method and system for automatic information exchange includes a processor and a memory coupled to the processor and operable to store a model. The model includes a plurality of objects where each of the plurality of objects includes an input variable and an output variable. The system also includes a loading engine residing in the memory and executable by the processor. The loading engine is operable to automatically create object links between corresponding input variables and output variables of each of the plurality of objects. The system may also include an update engine residing in the memory and executable by the processor. The update engine is operable to sequentially update each of the plurality of objects to obtain an output variable value for each of the plurality of objects.

31 Claims, 5 Drawing Sheets

METHOD AND SYSTEM FOR AUTOMATIC INFORMATION EXCHANGE

TECHNICAL FIELD OF THE INVENTION

The present invention relates generally to the field of information processing in a computer system and, more particularly, to a method and system for automatic information exchange.

BACKGROUND OF THE INVENTION

Information is often exchanged between tools or applications in a computer system and between groups of persons or employees within an organization. The information may include data, such as alphanumeric values, tables, and analysis data. For example, the data may define numerical relationships between independent and dependent variables in either tabular or functional form. The information may also include methods, such as tabular information, interpolation and extrapolation methodologies, and functional information, such as equations, intrinsics, and logic. For example, the methods may generally include the operations used to compute dependent variable values given independent variable values including the mechanics of interpolation and extrapolation.

However, because most tools or applications are written to use unique file formats and data structures, translation of both the data and the methods used to manipulate the data is generally required to accommodate an exchange of the information. Additionally, exchanging information between applications and groups is further aggravated by heterogenous computing environments. Thus, considerable amounts of effort and time are required to reformat and restructure the data and the methods prior to efficiently using the exchanged data and methods.

SUMMARY OF THE INVENTION

Accordingly, a need has arisen for an improved system and method for the efficient exchange and utilization of information between computer systems and groups of persons or employees within an organization. The present invention provides a method and system for automatic information exchange that substantially reduces or eliminates problems associated with prior systems and methods.

In accordance with an embodiment of the present invention, a system for automatic information exchange includes a processor and a memory coupled to the processor and operable to store a model. The model comprises a plurality of objects. Each of the plurality of objects comprises an input variable and an output variable. The system further includes a loading engine residing in the memory and executable by the processor. The loading engine is operable to automatically create object links between corresponding input variables and output variables of each of the plurality of objects.

According to another embodiment of the present invention, a method for automatic information exchange includes receiving a model at a processor. The model includes a plurality of objects. Each of the plurality of objects includes an input variable and an output variable. The method also includes automatically identifying the input variables and the output variables of each of the plurality of objects. The method further includes automatically creating object links between the corresponding input variables and output variables of each of the plurality of objects.

The present invention provides several technical advantages. For example, in one embodiment, a loading engine automatically links corresponding input variables and output variables of the objects of a model, thereby alleviating a requirement to manually create object links between the corresponding input variables and output variables of each of the model objects. Accordingly, users of the system need not know whether the data is in the form of a table or some combination of tables and functions.

Another technical advantage of the present invention includes sequentially updating each of the objects of the model to obtain output variable values while substantially eliminating duplicate object updates and redundant calculations. For example, in one embodiment, the system includes an update engine that sequentially updates each of the model objects as an output variable value of the object is required, thereby substantially eliminating redundant calculations and providing consistency of output variable values of the model.

Other technical advantages of the present invention will be readily apparent to one skilled in the art from the following figures, descriptions, and claims.

BRIEF DESCRIPTION OF THE DRAWINGS

For a more complete understanding of the present invention, and the advantages thereof, reference is now made to the following description taken in conjunction with the accompanying drawings, wherein like reference numerals represent like parts, in which.

DETAILED DESCRIPTION OF THE INVENTION

Figure 1:
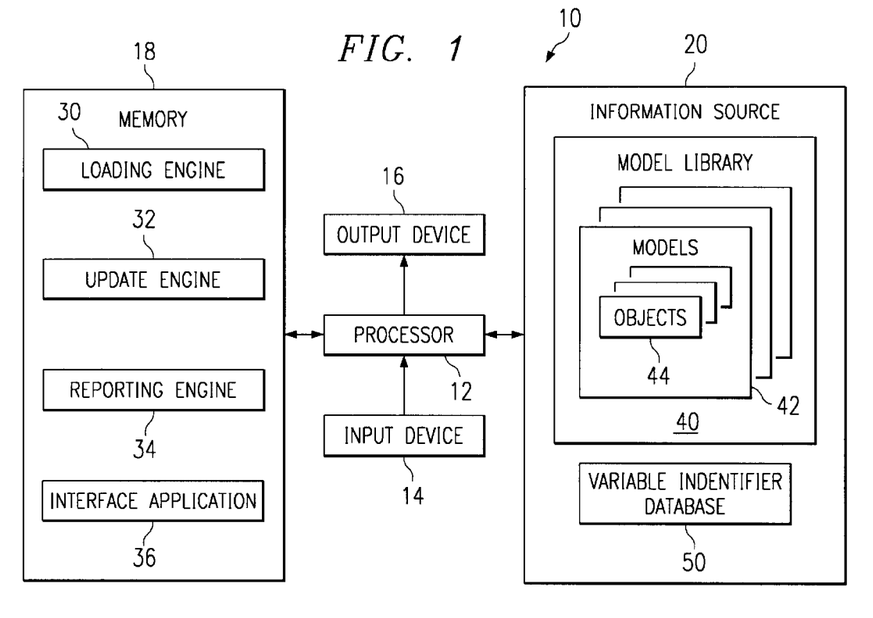
FIG. 1 is a block diagram illustrating a system for automatic information exchange in accordance with one embodiment of the present invention.

FIG. 1 is a block diagram illustrating a system 10 for automatic information exchange in accordance with one embodiment of the present invention. It will be understood that system 10 may be otherwise configured within the scope of the present invention. For example, system 10 may operate as a stand alone system or may be connected to a server system or other type of computing system.

In the embodiment illustrated in FIG. 1, system 10 comprises a processor 12, an input device 14, an output device 16, a memory 18, and an information source 20. The present invention also encompasses computer software that may be stored in memory 18 and executed by processor 12. The computer software may also be stored in a variety of other types of storage media including, but not limited to, floppy disk drives, hard drives, CD ROM disk drives, or magnetic tape drives. Information, such as variable value data or other types of data, may be received from a user of system 10 using a keyboard or any other type of input device 14. Output values or results may be output to a user of system 10 through output device 16, which may include a display, printer, or any other type of output device.

System 10 includes a loading engine 30, an update engine 32, a reporting engine 34, and an interface application 36, which are computer software programs. In FIG. 1, loading engine 30, update engine 32, reporting engine 34, and interface application 36 are illustrated as being stored in memory 18, where they can be executed by processor 12. Loading engine 30, update engine 32, reporting engine 34, and interface application 36 may also be stored on a variety of other types of storage media.

Loading engine 30 processes information from information source 20 in preparation for evaluation of the information using update engine 32. By way of example, information source 20 may comprise a model library 40 having one or more models 42 which may be selected by a user of system 10 using input device 14. Models 42 each include one or more cooperative collections of objects 44 to provide a simulation or analysis of selected information. However, models 42 may be otherwise configured to provide analysis, simulation or other user-defined information processing parameters.

Objects 44 generally include data sets, data tables, or functions for processing the information according to a selected model 42. Each object 44 represents an instance of some class, and whose classes are all members of a hierarchy of classes united via inheritance relationships. Each object 44 includes an input variable and an output variable. Each object 44 is an identifiable, encapsulated piece of code and data that provide one or more services when requested by a user. Thus, based on an input variable value, the object 44 provides an output variable value corresponding to the table, data set or function of the object 44. Loading engine 30 automatically creates object links between each of the input variables and output variables of the objects 44 of a selected model 42. As used herein, each means every one of at least a subset of the identified objects 44. Additionally, the term "automatically" means without further significant user action or interaction.

Information source 20 may also include a variable identifier database 50 including a unique identifier associated with each input variable and output variable of objects 44. For example, the unique identifier may include terminology, alphanumeric designations, phrases or other suitable identifiers to identify particular input variables and output variables of objects 44. The unique identifiers are maintained and stored in variable identifier database 50 such that loading engine 30 may access variable identifier database 50 for each object 44 included within a particular model 42 to automatically determine the input and output variable of the object 44 and automatically link corresponding input and output variables of the objects 44. However, the input and output variables of objects 44 may be otherwise identified and stored in variable identifier database 50.

Update engine 32 processes models 42 and automatically updates each object 44 of a model 42 sequentially to obtain output variable values of the user-selected model 42 based on user-defined input variable values. For example, update engine 32 sequentially updates each object 44 of a model 42 to obtain output variable values for each object 44 without performing redundant calculations. Thus, a particular object 44 may be updated when an output variable value of the updated object is required to support the update of another object 44. The methodology of updating objects 44 using update engine 32 will be discussed in greater detail below in conjunction with FIGS. 3 and 5.

Reporting engine 34 may be used to display output variable values of a particular model 42 to a user of system 10 using output device 16. For example, reporting engine 34 may provide output variable values in a particular format or structure as defined by a user using input device 14. However, reporting engine 34 may be otherwise used to display or provide output variable values to a user of system 10.

Interface application 36 may be used to receive input variable values from a user of system 10 using input device 14 and automatically associate the data or input variable values received from the user to corresponding input variables of objects 44. However, input variable values may be otherwise received and associated with the corresponding input variables of objects 44.

Figure 2:
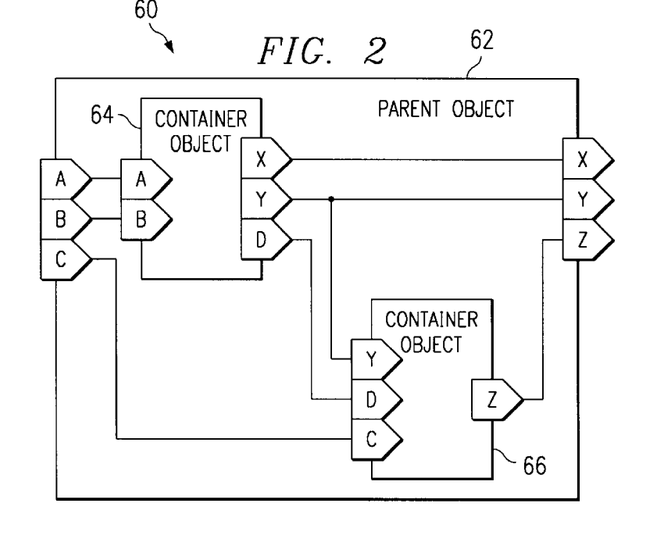
FIG. 2 is a block diagram illustrating a model of the system illustrated in FIG. 1 in accordance with an embodiment of the present invention.

FIG. 2 is a block diagram illustrating a model 60 in accordance with an embodiment of the present invention. Model 60 includes a parent object 62 and container objects 64 and 66 embedded within parent object 62. Container objects 64 and 66 may include a data set object, a function object, a table object, or other type of object. Additional objects may also be embedded within each container object 64 and 66. As illustrated in FIG. 2, parent object 62 includes input variables A and B and provides output variables X, Y, and D. Container object 64 receives values associated with input variables A and B and provides output variables X, Y, and D. Similarly, container object 66 receives output variables Y and D from container object 64 and input variable C to obtain output variable Z, which is also an output variable of parent object 62.

In operation, the input variables and output variables of parent object 62 and container objects 64 and 66 are stored in variable identifier database 50. Loading engine 30 is executed by processor 12 and automatically creates object links between the corresponding input variables and output variables of parent object 62 and container objects 64 and 66. For example, for model 60, loading engine 30 automatically identifies the objects of model 60, in this example, parent object 62 and container objects 64 and 66. Loading engine 30 also automatically identifies the input variables and output variables of each object of model 60 to provide object links between corresponding input and output variables.

For example, parent object 62 may represent a top-level object of model 60 such that a user provides input variable values for input variables A, B, and C to obtain output variable values for output variables X, Y, and Z. Loading engine 30 automatically identifies the container objects embedded within parent object 62, in this example, container objects 64 and 66, and automatically determines whether the input variables of parent object 62 correspond to an input variable of one of the container objects 64 and 66. In the embodiment illustrated in FIG. 2, loading engine 30 automatically creates an object link between input variables A and B of parent object 62 and input variables A and B of container object 64. Loading engine 30 also automatically creates an object link between input variable C of parent object 62 and input variable C of container object 66.

Additionally, loading engine 30 automatically creates object links between the container objects 64 and 66 embedded within parent object 62. In the example illustrated in FIG. 2, loading engine automatically creates an object link between output variables Y and D of container object 64 and corresponding input variables Y and D of container object 66. Loading engine 30 also automatically creates object links between output variables X and Y of container object 64 and output variable Z of container object 66 and output variables X, Y, and Z of parent object 62. Thus, loading engine 30 automatically identifies and creates object links between corresponding input variables and output variables of the objects comprising model 60, thereby alleviating a requirement of manually creating object links between various objects of model 60.

Accordingly, the present invention also provides greater ease of replacement and modification of objects 44 within a model 42 than prior systems and methods. For example, objects 44 may be freely modified or replaced without manually creating object links between the modified or replaced object 44 and other objects 44 of the model 42 because loading engine 30 automatically creates the object links between the various objects 44 of a model 42. Therefore, the present invention accommodates frequent object 44 modification and/or replacement.

Figure 3:
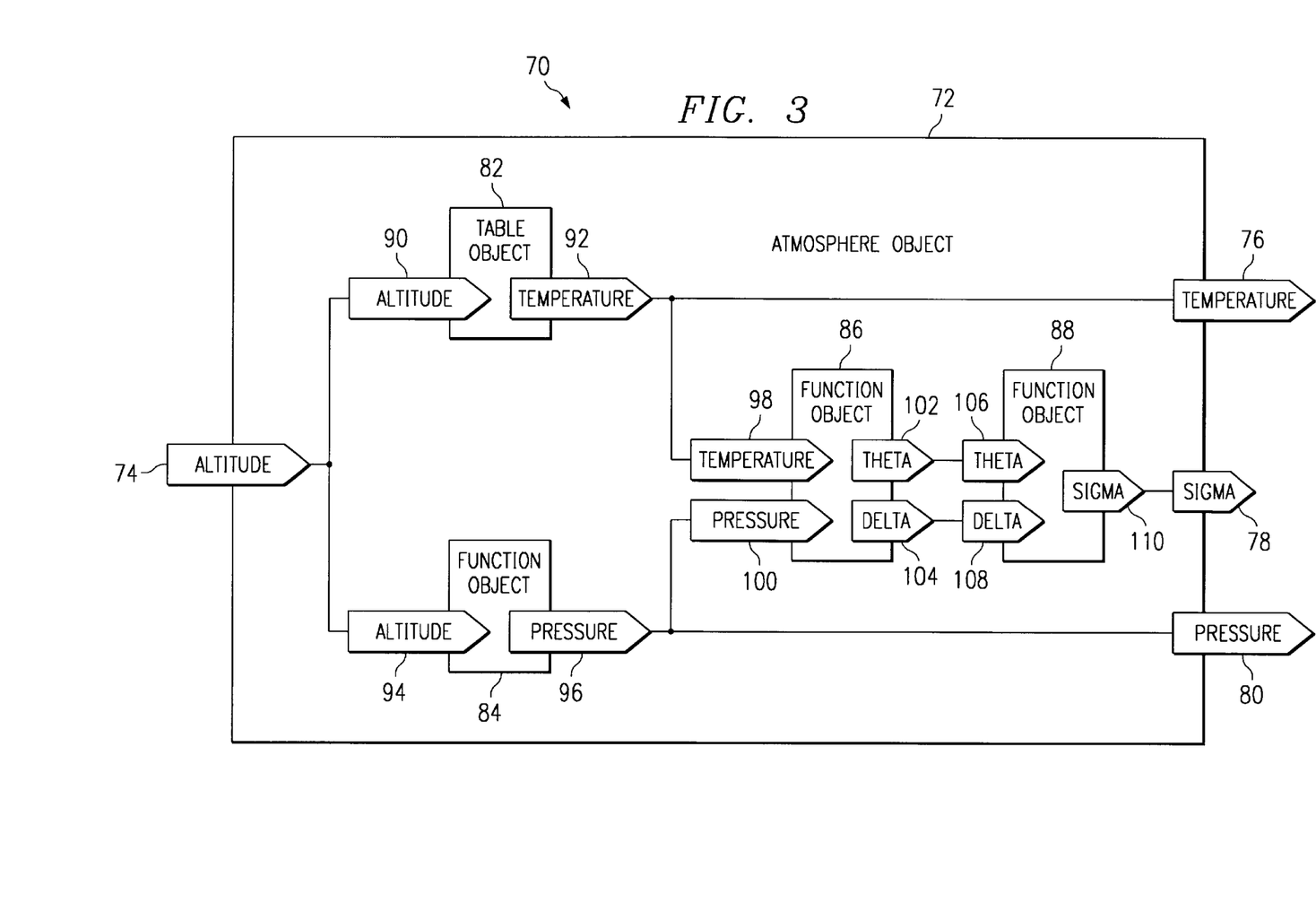
FIG. 3 is a block diagram illustrating another model of the system illustrated in FIG. 1 in accordance with an embodiment of the present invention.

FIG. 3 is a block diagram illustrating a model 70 in accordance with an embodiment of the present invention. In this embodiment, model 70 includes a parent or atmosphere object 72 having an input variable 74 and output variables 76, 78, and 80. Atmosphere object 72 includes a table object 82 and function objects 84, 86, and 88. Table object 82 includes an input variable 90 and an output variable 92. Function object 84 includes an input variable 94 and an output variable 96. Function object 86 includes input variables 98 and 100 and output variables 102 and 104. Function object 88 includes input variables 106 and 108 and an output variable 110.

In the embodiment illustrated in FIG. 3, model 70 provides a user of system 10 with various output variable values, for example, flight envelope data, in response to particular input data or input variable values. For example, input variable 74 of atmosphere object 72 may include an altitude value for an aircraft flight envelope. Table object 82 receives the altitude value as input variable 90 and provides a temperature value as output variable 92. The temperature value provided by output variable 92 is also output as output variable 76 of atmosphere object 72. Function object 84 receives the altitude value as input variable 94 and provides a pressure value as output variable 96. The pressure value provided as output variable 96 is also output to output variable 80 of atmosphere object 72.

Function object 86 receives the temperature value and the pressure value as input variables 98 and 100, respectively, and provides a theta value and a delta value as output variables 102 and 104, respectively. In this embodiment, the theta value may represent a temperature ratio as compared to a sea level temperature, and the delta value may represent a pressure ratio compared to a sea level pressure. Function object 88 receives the theta value and the delta value as input variables 106 and 108, respectively, and provides a sigma value as output variable 110. The sigma value is also output as output variable 78 of atmosphere object 72. In this embodiment, the sigma value may represent a ratio of the theta value and the delta value. Thus, based on a particular altitude values as input variable 74, model 70 provides a temperature value, a pressure value, and a sigma value as output variables 76, 78, and 80, respectively.

In operation, a user of system 10 may designate or select a particular model 42 from model library 40 and/or may also modify the objects 44 included within a particular model 42. Loading engine 30 automatically identifies the input variables and the output variables for each object 44 of the selected model 42. For example, loading engine 30 may access variable identifier database 50 to retrieve and identify each input variable and output variable of the objects 44 of model 42. For example, in connection with FIG. 3, loading engine 30 accesses variable identifier database 50 and automatically identifies the input variables and the output variables for atmosphere object 72, table object 82, and function objects 84, 86, and 88.

Loading engine 30 initially automatically selects one of the objects 82, 84, 86 and 88 of atmosphere object 72 to create object links between the input variables and output variables of the objects 82, 84, 86 and 88 and atmosphere object 72. For example, loading engine 30 may automatically select table object 82; however, loading engine 30 may also automatically select other container objects within atmosphere object 72. After selecting table object 82, loading engine 30 automatically identifies input variable 90 of table object 82 and automatically determines whether input variable 90 is also an input variable of atmosphere object 72. In the embodiment illustrated in FIG. 3, input variable 74 is also used as input variable 90 of table object 82, therefore, loading engine 30 automatically creates an object link between input variable 74 and input variable 90. Loading engine 30 next automatically determines whether additional input variables exist for table object 82. In this example, no additional input variables exist for table object 82. Because no additional input variables exist for table object 82, loading engine 30 next automatically identifies the output variable for table object 82, in this example, output variable 92.

After identifying output variable 92 of table object 82, loading engine 30 automatically determines whether output variable 92 of table object 82 is also an output variable of atmosphere object 72. In this case, because the temperature value of output variable 92 is also output variable 76 of atmosphere object 72, loading engine 30 automatically creates an object link between output variable 76 of atmosphere object 72 and output variable 92 of table object 82. Loading engine 30 next automatically determines whether additional output variables exist for table object 82. In this example, because no additional output variables exist for table object 82, loading engine 30 next automatically determines whether additional container objects are embedded within atmosphere object 72.

Loading engine 30 next automatically selects another container object within atmosphere object 72, for example, function object 84. Loading engine 30 automatically identifies the input variable for function object 84 and automatically determines whether the input variable for function object 84 is also the input variable for atmosphere object 72. In this example, because the altitude value input to atmosphere object 72 is also used as an input variable value for function object 84, loading engine 30 automatically creates an object link between input variable 74 of atmosphere object 72 and input variable 94 of function object 84.

Loading engine 30 next automatically determines whether additional input variables exist for function object 84. In this example, because no additional input variables exist for function object 84, loading engine 30 next automatically identifies the output variables for function object 84. Loading engine 30 automatically identifies output variable 96 of function object 84 and automatically determines whether output variable 96 is also an output variable of atmosphere object 72. In this example, because the pressure value provided by function object 84 is also an output variable value of atmosphere object 72, loading engine 30 automatically creates an object link between output variable 80 of atmosphere object 72 and output variable 96 of function object 84.

Loading engine 30 next automatically determines whether additional output variables exist for function object 84. In this example, because no additional output variables exist for function object 84, loading engine 30 next automatically determines whether additional container objects are embedded within atmosphere object 72 and, if additional container objects are embedded within atmosphere object 72, automatically selects another one of the container objects embedded within atmosphere object 72, for example, function object 86.

After selecting function object 86, loading engine 30 automatically identifies an input variable for function object 86, for example, input variable 98, and automatically determines whether input variable 98 is also an input variable of atmosphere object 72. In this example, as illustrated in FIG. 3, because input variable 98 is not an input variable to atmosphere object 72, loading engine 30 next automatically queries other container objects within atmosphere object 72 at the same object level as function object 86, often referred to as sibling objects, to determine whether input variable 98 is an output variable of a sibling container object embedded within atmosphere object 72. If loading engine 30 does not locate a corresponding output variable of another container object within atmosphere object 72 to provide a value for input variable 98, loading engine 30 may automatically transmit an alarm or warning signal to the user of system 10 indicating that input variable 98 does not have an associated object link, thereby indicating to the user that the model requires modification.

In the embodiment illustrated in FIG. 3, loading engine 30 automatically identifies output variable 92 of table object 82 as corresponding to input variable 98 of function object 86. For example, because the input and output variables have been assigned unique identifiers and stored in variable identifier database 50, loading engine 30 automatically accesses variable identifier database 50 to determine corresponding input and output variables of the objects of a particular model. Thus, loading engine automatically creates an object link between output variable 92 and input variable 98.

Loading engine 30 next automatically determines whether additional input variables exist for function object 86. In this example, loading engine 30 automatically identifies input variable 100 as another input variable of function object 86. As described above, if loading engine 30 determines that input variable 100 is not an input variable of atmosphere object 72, loading engine 30 automatically queries other sibling container objects embedded within atmosphere object 72 to determine whether an output variable of one of the sibling container objects provides a value for input variable 100. In this example, output variable 96 of function object 84 corresponds to input variable 100. Therefore, loading engine 30 automatically creates an object link between output variable 96 and input variable 100.

After automatically determining that no additional input variables exist for function object 86, loading engine 30 next automatically identifies the output variables for function object 86, in this example, output variables 102 and 104. For each output variable 102 and 104 of function object 86, after automatically determining that output variables 102 and 104 are not output variables of atmosphere object 72, loading engine 30 automatically queries other sibling container objects within atmosphere object 72 to identify input variables corresponding to the output variables 102 and 104 of function object 86. For example, loading engine 30 automatically determines that output variables 102 and 104 correspond to input variables 106 and 108 of function object 88, respectively. If an object link does not already exist between output variables 102 and 104 and input variables 106 and 108, respectively, loading engine 30 automatically creates te object links between output variables 102 and 104 and input variables 106 and 108, respectively. After automatically determining that no additional output variables exist for function object 86, loading engine 30 next automatically determines whether additional container objects are embedded within atmosphere object 72, for example, function object 88.

Loading engine 30 next automatically identifies the input variables of function object 88, in this example, input variables 106 and 108. After determining that input variables 106 and 108 are not input variables of atmosphere object 72, loading engine 30 automatically determines whether output variables of other sibling container objects embedded within atmosphere object 72 provide output variable values corresponding to input variables 106 and 108. In the embodiment illustrated in FIG. 3, loading engine 30 automatically determines that output variables 102 and 104 of function object 86 provide output variable values corresponding to input variables 106 and 108, respectively. However, because object links already exist between output variables 102 and 104 and input variables 106 and 108, respectively, loading engine 30 next automatically determines whether additional input variables exist for function object 88. In this example, because no additional input variables exist for function object 88, loading engine 30 next automatically identifies the output variables for function object 88.

In this example, loading engine 30 automatically identifies output variable 110 for function object 88 and, after automatically determining that output variable 110 is also an output variable of atmosphere object 72, automatically creates an object link between output variable 78 of atmosphere object 72 and output variable 110 of function object 88. After automatically determining that no additional output variables exist for function object 88, and that no additional container objects are embedded within atmosphere object 72, the method of automatically creating object links between the corresponding input variables and output variables of the objects of model 70 is complete.

Thus, the present invention provides greater efficiency of information exchange than prior systems by automatically identifying and creating object links between corresponding input variables and output variables of the objects of a model. Although the embodiment illustrated in FIG. 3 contains only two levels of objects, for example, a parent object and a first level of container objects embedded within the parent object, it should be understood that object links may be automatically created using loading engine 30 for multiple levels of objects embedded within other objects.

After loading engine 30 automatically creates object links between corresponding input variables and output variables of the objects 44 of a particular model 42, update engine 32 sequentially updates each of the objects 44 of the model 42 to obtain output variable values for the model 42. For example, referring to FIG. 3, update engine 32 automatically identifies an output variable of atmosphere object 72, for example, output variable 76. Update engine 32 next automatically determines the container object embedded within atmosphere object 72 that provides an output variable value corresponding to output variable 76. In this example, update engine 32 automatically identifies table object 82 as providing an output variable value corresponding to output variable 92 and output variable 76.

Update engine 32 next automatically identifies the input variable for table object 82 required for updating table object 82, in this example, input variable 90. Update engine next automatically determines whether an input variable value corresponding to input variable 90 is known. In this example, because an altitude value is provided for input variable 74 for atmosphere object 72, the input variable value for input variable 90 is known, and update engine 32 next automatically determines whether additional input variables are required for updating table object 82. In this example, because no additional input variable values are required for updating table object 82, update engine 32 next automatically updates table object 82 using the input variable value corresponding to input variable 90 to obtain an output variable value corresponding to output variable 92 and output variable 76.

Update engine 32 next automatically determines whether another output variable exists for atmosphere object 72. In this example, update engine 32 automatically identifies, for example, output variable 80 of atmosphere object 72. As described above, update engine 32 automatically determines the container object responsible for providing an output variable value corresponding to output variable 80, in this example, function object 84. Update engine 32 next automatically identifies an input variable of function object 84 required for updating function object 84. In this example, update engine 32 automatically identifies input variable 94 required for updating function object 84 and automatically determines whether an input variable value is known for input variable 94. Because an altitude value is provided for input variable 74 of atmosphere object 72, the input variable value for input variable 94 is known, and update engine 32 next automatically determines whether additional input variables are required for updating function object 84. Because no additional input variables are required for updating function object 84, update engine 32 next automatically updates function object 84 using the input variable value corresponding to input variable 94 to obtain an output variable value corresponding to output variable 96 and output variable 80.

Update engine 32 next automatically determines whether another output variable exists for atmosphere object 72. In this example, update engine 32 automatically identifies output variable 78 of atmosphere object 72. Update engine 32 next automatically determines the container object embedded within atmosphere object 72 requiring updating to provide an output variable value corresponding to output variable 78, in this example, function object 88.

Update engine 32 next automatically identifies an input variable required for updating function object 88 and automatically determines whether an input variable value is known for the required input variable. For example, update engine 32 automatically identifies input variable 106 required for updating function object 88. However, in this example, an input variable value corresponding to input variable 106 is not yet known. Because the input variable value corresponding to input variable 106 is not yet known, update engine 32 automatically determines the container object embedded within atmosphere object 72 responsible for providing an input variable value for input variable 106, in this example, function object 86.

Update engine 32 next automatically identifies an input variable required for updating function object 86, for example, input variable 98. Update engine 32 also automatically determines whether an input variable value corresponding to input variable 98 is known. As described above, if an input variable value corresponding to input variable 98 is not known, update engine automatically determines the container object responsible for providing the required input variable. Thus, update engine 32 automatically updates the objects 44 within a model 44 to determine output variable values as the output variable values become necessary for updating other objects 44.

In this example, because the input variable value corresponding to output variable 92 has been previously obtained by updating table object 82, the input variable value corresponding to input variable 98 is known. Update engine 32 next automatically determines whether additional input variables are required for updating function object 86. In this example, input variable 100 is also required for updating function object 86. Update engine 32 next automatically determines whether an input variable value corresponding to input variable 100 is known. As described above, if an input variable value corresponding to input variable 100 is not known, update engine 32 automatically determines the container object responsible for providing the required input variable value, thereby updating each object within atmosphere object 72 until the required input variable value is obtained. In this example, an input variable value corresponding to input variable 100 is provided by previously updated function object 84 via an output variable value corresponding to output variable 96. After automatically determining that no additional input variables are required for updating function object 86, update engine 32 automatically updates function object 86 to provide output variable values corresponding to output variables 102 and 104.

After an input variable value corresponding to input variable 106 is obtained, update engine 32 automatically determines whether an additional input variable is required for updating function object 88. In this example, update engine 32 automatically identifies input variable 108 required for updating function object 88. Update engine 32 next automatically determines whether an input variable value is known corresponding to input variable 108. Because function object 86 has been previously updated, thereby providing an output variable value corresponding to output variable 104, the input variable value corresponding to input variable 108 is also known. After automatically determining that no additional input variables are required for updating function object 88, update engine 32 next automatically updates function object 88 to provide an output variable value corresponding to output variable 110 and corresponding output variable 78. The output variable values-corresponding to output variables 76, 78 and 80 may then be output to a user using reporting engine 34 in the form of a display, printed report, or other suitable output medium.

Therefore, the present invention automatically creates object links between corresponding input variables and output variables of the objects 44 of a particular model 42 and sequentially updates each of the objects 44 to obtain corresponding output variable values for the model 42. Thus, manual intervention to provide object links between each of the objects 44 of a model 42 is substantially eliminated. Additionally, each object 44 of a particular model 42 is updated in an order to substantially eliminate redundant calculations, thereby resulting in increased efficiency and computing speed. Although the embodiment illustrated in FIG. 3 contains only two levels of objects, for example, a parent object and a first level of container objects embedded within the parent object, it should be understood that multiple levels of objects embedded within another object are automatically updated using update engine 32 as described above.

Figure 4A:
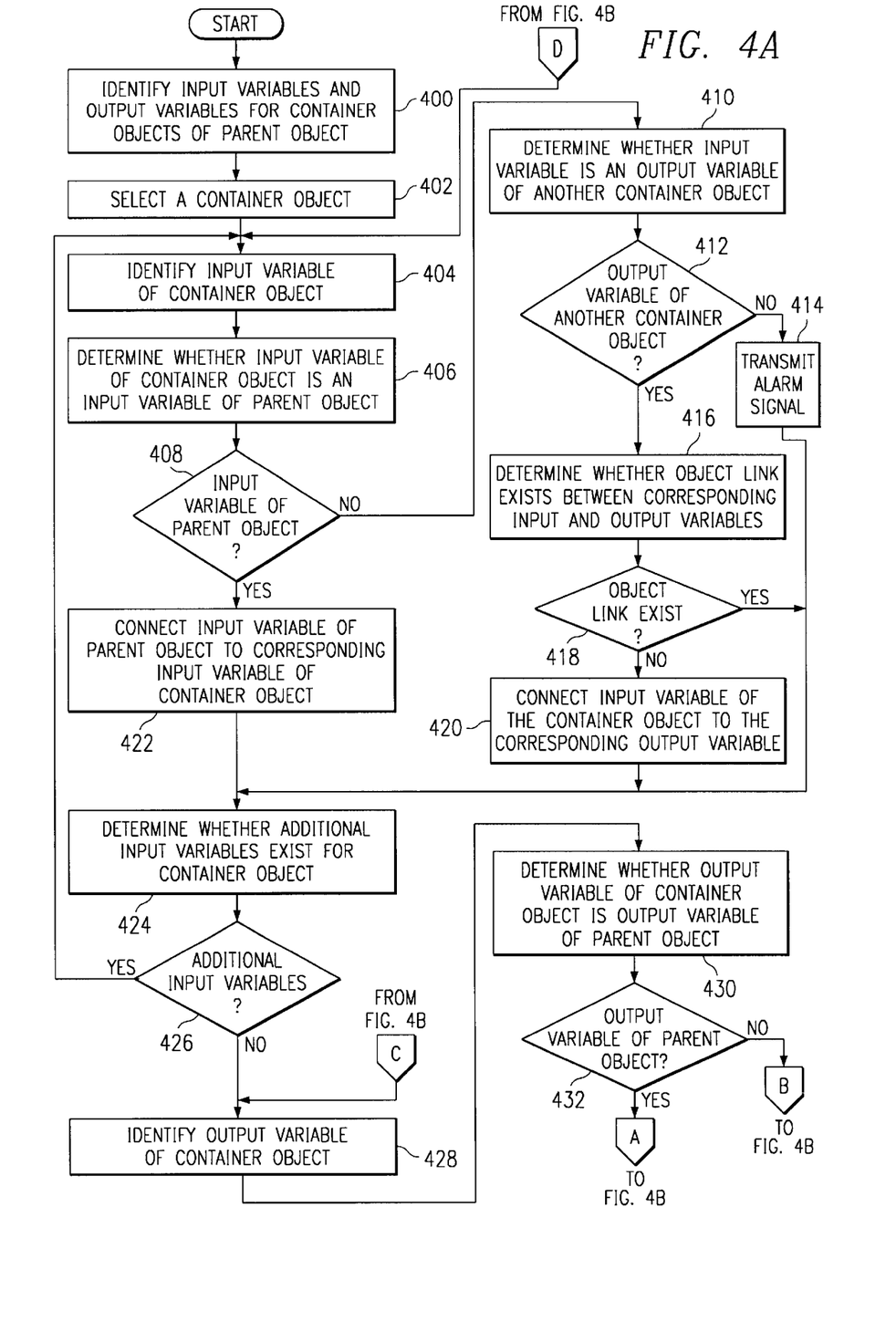
FIGS. 4A and 4B are flow diagrams illustrating a method for automatic model object linking in accordance with an embodiment of the present invention.
Figure 4B:
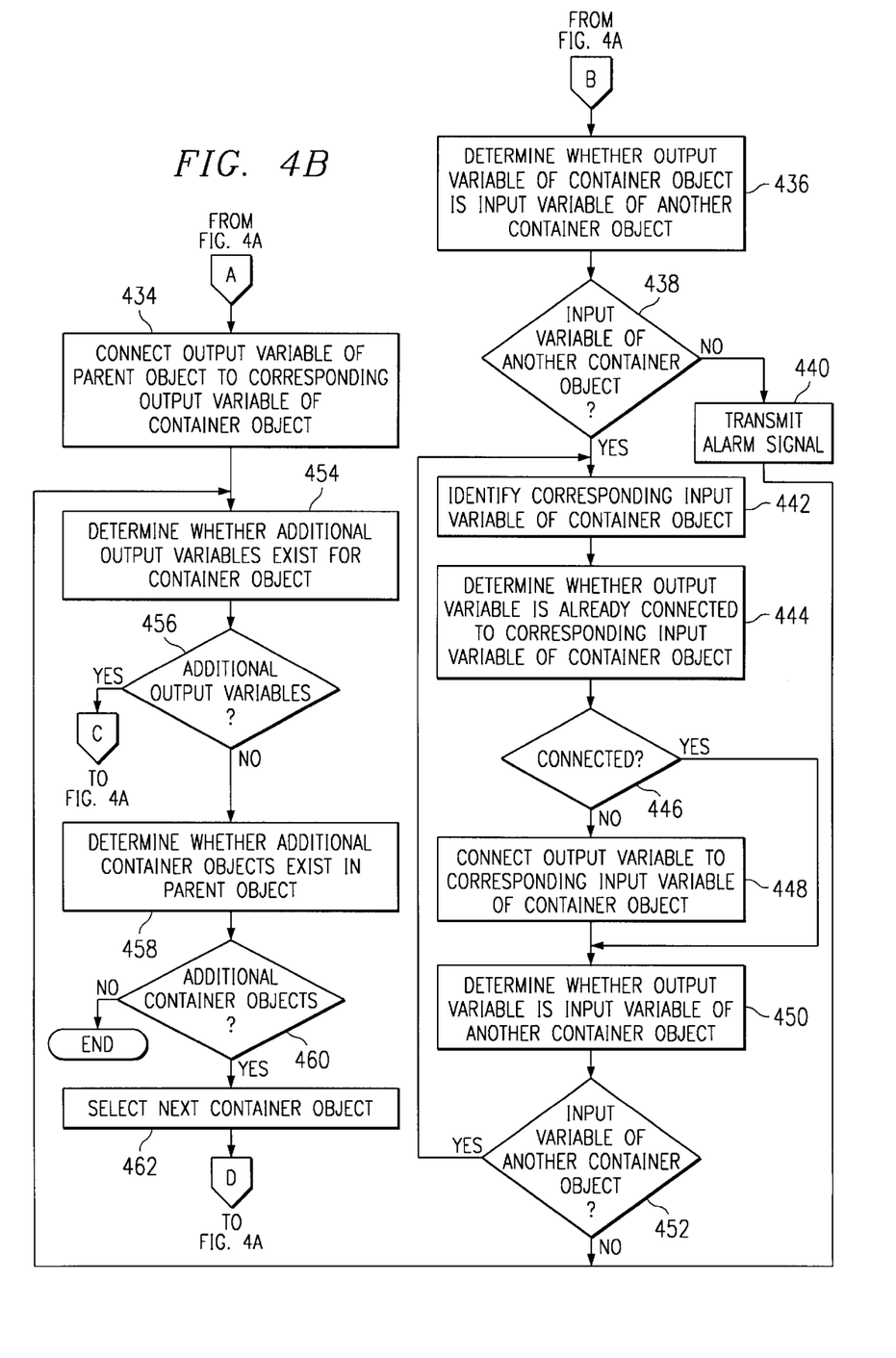

FIGS. 4A and 4B are flow diagrams illustrating a method for automatically creating object links between corresponding input variables and output variables of objects 44 of a model 42 in accordance with an embodiment of the present invention. The method begins at step 400 where loading engine 30 automatically identifies the input variables and the output variables for each container object of a parent object for a model 42. For example, loading engine 30 may automatically access variable identifier database 50 to identify the input variables and output variables of each object 44 for a model 42. At step 402, loading engine 30 automatically selects one of the container objects embedded within the parent object. Loading engine 30 next automatically identifies an input variable corresponding to the selected container object at step 404.

At step 406, loading engine 30 automatically determines whether the input variable identified at step 404 is an input variable of the parent object. At decisional step 408, if the input variable of the identified container object is not an input variable of the parent object, the method proceeds to step 410 where loading engine 30 automatically determines whether the input variable of the selected container object is an output variable of another sibling container object embedded within the parent object.

At decisional step 412, if the input variable of the selected container object is not an output variable of another container object within the current object, the method proceeds to step 414, where an alarm or warning signal may be automatically transmitted to the user of system 10 indicating that the selected container object requires a corresponding input variable. If the input variable of the selected container object is an output variable of another sibling container object, the method proceeds from step 412 to step 416, where loading engine 30 automatically determines whether an object link already exists between the corresponding input and output variables. At decisional step 418, if the object link does not already exist between the corresponding input and output variables, the method proceeds to step 420, where loading engine 30 automatically creates an object link between the input variable of the selected container object and the corresponding output variable of the sibling container object. The method then proceeds from step 420 to step 424. At decisional step 418, if the object link already exists, the method proceeds from step 418 to step 424.

At decisional step 408, if the input variable of the selected container object is also an input variable of the parent object, the method proceeds from step 408 to step 422, where loading engine 30 automatically creates an object link between the input variable of the selected container object and the corresponding input variable of the parent object. The method then proceeds from step 422 to step 424, where loading engine 30 automatically determines whether additional input variables exist for the selected container object. At decisional step 426, if additional input variables exist for the selected container object, the method returns to step 404, where loading engine 30 automatically identifies the additional input variable of the selected container object. If no additional input variables exist for the selected container object, the method proceeds from step 426 to step 428, where loading engine 30 automatically identifies an output variable of the selected container object.

At step 430, loading engine 30 automatically determines whether the output variable of the selected container object is also an output variable of the parent object. At decisional step 432, if the output variable of the selected container object is also an output variable of the parent object, the method proceeds from step 432 to step 434, where loading engine 30 automatically creates an object link between the output variable of the selected container object and the corresponding output variable of the parent object. At decisional step 432, if the output variable of the selected container object is not an output variable of the parent object, the method proceeds from step 432 to step 436, where loading engine 30 automatically determines whether the output variable of the selected container object is an input variable for another container object embedded within the parent object.

At decisional step 438, if the output variable of the selected container object is not an input variable of another container object embedded within the parent object, the method proceeds to step 440, where an alarm or warning signal may be automatically transmitted to the user of system 10 indicating that an unused output variable exists within the model 42. If the output variable of the selected container object is an input variable of another sibling container object, the method proceeds from step 438 to step 442, where loading engine 30 automatically identifies the corresponding input variable of the sibling container object.

At step 444, loading engine 30 automatically determines whether an object link already exists between the output variable of the selected container object and the corresponding input variable of the sibling container object. At decisional step 446, if the object link does not already exist between the output variable of the selected container object and the corresponding input variable of the sibling container object, loading engine 30 automatically creates an object link between the output variable of the selected container object and the corresponding input variable of the sibling container object at step 448.

At decisional step 446, if an object link already exists between the output variable of the selected container object and the corresponding input variable of the sibling container object, the method proceeds from step 446 to step 450, where loading engine 30 automatically determines whether the output variable of the selected container object is also an input variable of another sibling container object. At decisional step 452, if the output variable of the selected container object is also an input variable of another sibling container object, the method returns to step 442, where the corresponding input variable is identified and an object link created if necessary. If the output variable of the selected container object is not an input variable of another sibling container object, the method proceeds from step 452 to step 454, where loading engine 30 automatically determines whether an additional output variable exists for the selected container object.

At decisional step 456, if an additional output variable exists for the selected container object, the method returns to step 428. If no additional output variables exist for the selected container object, the method proceeds from step 456 to step 458, where loading engine 30 automatically determines whether additional container objects exist within the parent object. At decisional step 460, if additional container objects exist within the parent object, the method proceeds to step 462, where loading engine 30 automatically selects another container object embedded within the parent object. After step 462, the method returns to step 404. At decisional step 460, if no additional container objects exist within the parent object, the method terminates.

Figure 5:
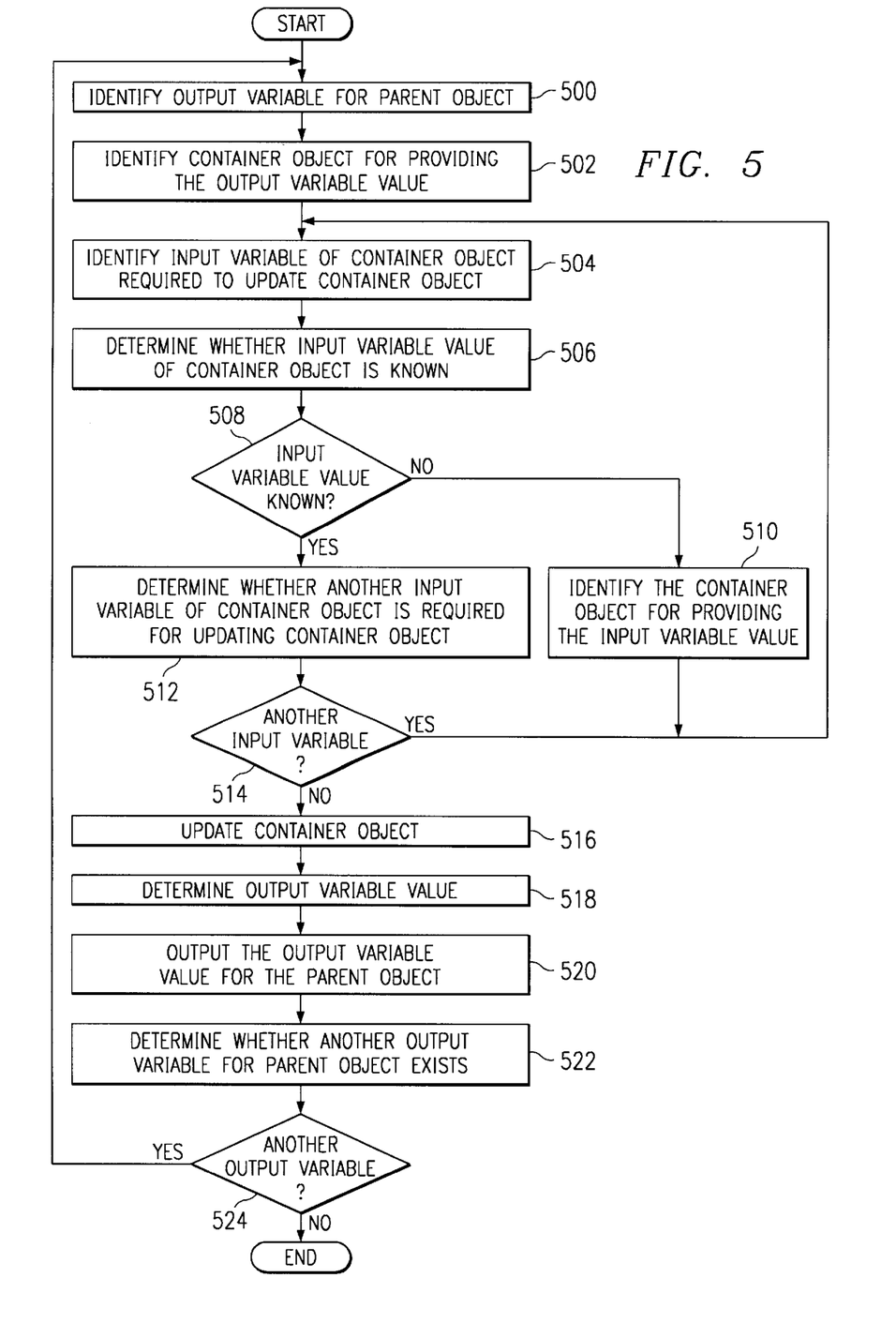
FIG. 5 is a flow diagram illustrating a method for updating model objects in accordance with an embodiment of the present invention.

FIG. 5 is a flow diagram illustrating a method for automatically updating the objects 44 of a model 42 in accordance with an embodiment of the present invention. The method begins at step 500, where update engine 32 automatically identifies an output variable for a parent object of the model 42. At step 502, update engine 32 automatically identifies the container object embedded within the parent object responsible for providing an output variable value corresponding to the identified output variable. At step 504, update engine 32 automatically identifies an input variable of the identified container object required for updating the identified container object. At step 506, update engine 32 automatically determines whether an input variable value corresponding to the identified input variable of the container object is known.

At decisional step 508, if an input variable value corresponding to the input variable of the identified container object is not known, the method proceeds from step 508 to step 510, where update engine 32 automatically identifies another container object embedded within the parent object responsible for providing the input variable value. After update engine 32 identifies the next container object embedded within the parent object responsible for providing the required input variable value, the method returns to step 504. If the input variable value corresponding to the input variable of the identified container object is known, the method proceeds from step 508 to step 512, where update engine 32 automatically determines whether another input variable of the container object is required for updating the container object.

At decisional step 514, if another input variable is required for updating the container object, the method returns to step 504. If another input variable of the container object is not required for updating the container object, the method proceeds from step 514 to step 516, where update engine 32 automatically updates the container object. At step 518, update engine 32, by updating the container object at step 516, automatically determines an output variable value associated with the container object. At step 520, update engine 32 outputs the corresponding output variable value for the parent object. As described above, reporting engine 34 may be used to provide the user with the output variable value in a variety of formats and media.

At step 522, update engine 32 automatically determines whether another output variable exists for the parent object. At decisional step 524, if another output variable exists for the parent object, the method returns to step 500. If no other output variables exist for the parent object, the method terminates.

Therefore, as illustrated in FIG. 5, each object 44 of a model 42 is sequentially updated as the input variable values to the object become known and as the output variable values from each object 44 are required for updating another object. Thus, in one embodiment, the present invention substantially eliminates redundant calculations and duplicate updating of the objects 44.

Although the present invention has been described in detail, it should be understood that various changes, substitutions, and alterations can be made therein without departing from the spirit and scope of the present invention as defined by the appended claims.

What is claimed is:

1. A system for automatic information exchange, comprising:
   a processor;
   an information source coupled to the processor and operable to store a model, the model comprising a plurality of objects, each of the plurality of objects comprising an input variable and an output variable; and
   a loading engine residing in a memory and executable by the processor, the loading engine operable to automatically create object links between corresponding input variables and output variables of each of the plurality of objects.

2. The system of claim 1, further comprising a variable identifier database coupled to the processor, the variable identifier database having a variable identifier associated with each of the input variables and the output variables of the plurality of objects, and wherein the processor operates to automatically access the variable identifier database to identify the input variable and the output variable of each of the plurality of objects.

3. The system of claim 1, wherein the plurality of objects comprises a parent object and a plurality of container objects embedded within the parent object, and wherein the loading engine operates to automatically create object links between the corresponding input variables and output variables of the plurality of container objects.

4. The system of claim 1, further comprising an update engine residing in the memory and executable by the processor, the update engine sequentially updating each of the plurality of objects to obtain an output variable value for each of the plurality of objects.

5. The system of claim 4, wherein the plurality of objects comprises a parent object and a plurality of container objects embedded within the parent object, and wherein the update engine operates to sequentially update each of the plurality of container objects to obtain an output variable value for the parent object.

6. The system of claim 1, further comprising a data interface application residing in the memory and executable by the processor, the data interface application operable to receive data from a user and automatically associate the data to the corresponding input variable of the plurality of objects.

7. The system of claim 1, wherein the plurality of objects comprises a parent object and a plurality of container objects embedded within the parent object, and wherein the loading engine operates to automatically create an object link between an input variable of the parent object and the corresponding input variable of one of the plurality of container objects.

8. The system of claim 7, wherein the loading engine further operates to automatically create an object link between an output variable of one of the plurality of container objects and the corresponding input variable of another one of the plurality of container objects.

9. The system of claim 7, wherein the loading engine further operates to automatically create an object link between the output variable of one of the plurality of container objects and the corresponding output variable of the parent object.

10. A method for automatic information exchange, comprising:
    retrieving a model from an information source, the model having a plurality of objects, each of the plurality of objects having an input variable and an output variable;
    automatically identifying the input variables and the output variables of each of the plurality of objects; and
    automatically creating object links between the corresponding input variables and output variables of each of the plurality of objects.

11. The method of claim 10, wherein the plurality of objects comprises a parent object and a container object disposed within the parent object, and wherein automatically creating object links comprises creating an object link between an input variable of the parent object and a corresponding input variable of the container object.

12. The method of claim 11, wherein automatically creating object links further comprises automatically creating an object link between an output variable of the container object and a corresponding output variable of the parent object.

13. The method of claim 10, wherein the plurality of objects comprises a parent object and a plurality of container objects embedded within the parent object, and wherein automatically creating object links comprises automatically creating an object link between an output variable of one of the container objects and a corresponding input variable of another one of the container objects.

14. The method of claim 10, further comprising updating each of the plurality of objects sequentially to obtain an output variable value for the model.

15. The method of claim 14, wherein updating comprises:
identifying an output variable of the model;
determining which of the plurality of objects requires updating to obtain an output variable value for the output variable;
updating the corresponding object to obtain the output variable value for the output variable of the model; and
displaying the output variable value to a user.

16. The method of claim 15, further comprising:
identifying an input variable of the object requiring updating;
determining whether an input variable value for the input variable is known; and
updating the object using the input variable value if the input variable value is known.

17. A method for automatic information exchange, comprising:
receiving a model at a processor, the model having a parent object and a plurality of container objects embedded within the parent object, the parent object and each of the plurality of container objects having an input variable and an output variable;
automatically creating an object link between the input variable of the parent object and a corresponding input variable of one of the plurality of container objects;
automatically creating an object link between the output variable of the parent object and a corresponding output variable of one of the plurality of container objects; and
automatically updating each of the plurality of container objects sequentially to obtain an output variable value for the output variable of the parent object.

18. The method of claim 17, further comprising creating an object link between the output variable of one of the plurality of container objects and a corresponding input variable of another one of the plurality of container objects.

19. The method of claim 17, wherein automatically creating an object link between the output variable of the parent object and a corresponding output variable of one of the plurality of container objects comprises:
accessing a variable identifier database to identify the output variables of each of the plurality of container objects;
identifying one of the plurality of container objects responsible for providing an output variable value corresponding to the output variable of the parent object; and
automatically creating an object link between the output variable of the identified container object and the output variable of the parent object.

20. The method of claim 17, wherein automatically updating each of the plurality of container objects comprises:
identifying the output variable of the parent object;
determining which of the plurality of container objects responsible for providing an output variable value corresponding to the output variable of the parent object; and
automatically updating the identified container object to obtain the output variable value corresponding to the output variable of the parent object.

21. The method of claim 20, further comprising:
identifying the input variable of the identified container object;
determining whether an input variable value is identified with the input variable of the identified container object; and
if the input variable value is not identified with the input variable, determining a next one of the plurality of container objects requiring updating to obtain the input variable value.

22. A system for automatic information exchange, comprising:
a computer readable medium; and
software stored on the computer readable medium, the software operable to identify a model, the model having a plurality of objects, each object having an input variable and an output variable, the software further operable to automatically create object links between each of the corresponding input variable and output variables of the plurality of objects.

23. The system of claim 22, wherein the plurality of objects comprises a parent object and a container object disposed within the parent object, and wherein the software operates to automatically create an object link between an input variable of the parent object and a corresponding input variable of the container object.

24. The system of claim 23, wherein the software further operates to create an object link between an output variable of the container object and a corresponding output variable of the parent object.

25. The system of claim 22, wherein the plurality of objects comprises a parent object and a plurality of container objects embedded within the parent object, and wherein the software operates to create an object link between an output variable of one of the container objects and a corresponding input variable of another one of the container objects.

26. The system of claim 22, wherein the software is operates to update each of the plurality of objects sequentially to obtain an output variable value for the model.

27. The system of claim 26, wherein the software operates to:
identify an output variable of the model;
determine which of the plurality of objects requires updating to obtain an output variable value for the output variable; and
update the corresponding object to obtain the output variable value for the output variable of the model.

28. The system of claim 27, wherein the software further operates to:
identify an input variable of the object requiring updating;
determine whether an input variable value for the input variable is known; and
update the object using the input variable value if the input variable value is known.

29. A system for automatic information exchange, comprising:
a processor;
an information source coupled to the processor and operable to store a model, the model comprising a plurality of objects, each of the plurality of objects comprising an input variable and an output variable;
a loading engine residing in a memory and executable by the processor, the loading engine operable to create object links between corresponding input variables and output variables of each of the plurality of objects;

a variable identifier database coupled to the processor, the variable identifier database having a variable identifier associated with each of the input variables and the output variables of the plurality of objects, and wherein the processor operates to access the variable identifier database to identify the input variable and the output variable of each of the plurality of objects;

an update engine residing in the memory and executable by the processor, the update engine operable to sequentially update each of the plurality of objects to obtain an output variable value for each of the plurality of objects; and a data interface application residing in the memory and executable by the processor, the data interface application operable to receive data from a user and automatically associate the data to the corresponding input variable of the plurality of objects.

30. The system of claim 29, wherein the plurality of objects comprises a parent object and a plurality of container objects embedded within the parent object, and wherein the update engine operates to sequentially update each of the plurality of container objects to obtain an output variable value for the parent object.

31. A method for automatic information exchange, comprising:

receiving a model at a processor, the model having a parent object and a plurality of container objects embedded within the parent object, the parent object and each of the plurality of container objects having an input variable and an output variable;

creating an object link between the input variable of the parent object and a corresponding input variable of one of the plurality of container objects;

creating an object link between the output variable of the parent object and a corresponding output variable of one of the plurality of container objects, wherein creating an object link comprises:

accessing a variable identifier database to identify the output variables of each of the plurality of container objects;

identifying one of the plurality of container objects responsible for providing an output variable value corresponding to the output variable of the parent object;

creating an object link between the output variable of the identified container object and the output variable of the parent object; and updating each of the plurality of container objects sequentially to obtain an output variable value for the output variable of the parent object, wherein updating comprises:

identifying the output variable of the parent object;

determining the container object of the plurality of container objects responsible for providing an output variable value corresponding to the output variable of the parent object; and updating the identified container object to obtain the output variable value corresponding to the output variable of the parent object.

* * * * *

UNITED STATES PATENT AND TRADEMARK OFFICE
CERTIFICATE OF CORRECTION

PATENT NO.    : 6,684,220 B1
DATED         : January 27, 2004
INVENTOR(S)   : Pfeiffer et al.

It is certified that error appears in the above-identified patent and that said Letters Patent is hereby corrected as shown below:

Title page,
Item [56], References Cited, OTHER PUBLICATIONS, "Bayol, Catherine" reference delete "la Velisation Pour".

Column 16,
Line 40, after "software" delete "is".

Signed and Sealed this

Twentieth Day of July, 2004

JON W. DUDAS
*Acting Director of the United States Patent and Trademark Office*